United States Patent [19]
Fulcher

[11] Patent Number: 5,802,197
[45] Date of Patent: Sep. 1, 1998

[54] AUDIO DECOY

[76] Inventor: Daniel B. Fulcher, 3231 Big Oak Lake Rd., Spring Hill, Tenn. 37174

[21] Appl. No.: 819,776

[22] Filed: Mar. 18, 1997

Related U.S. Application Data

[60] Provisional application No. 60/013567 Mar. 18, 1996.
[51] Int. Cl.$^6$ .................................................. H04R 25/00
[52] U.S. Cl. ........................... 381/205; 381/56; 446/397; 446/297
[58] Field of Search ........................ 381/205, 56, 188; 446/193, 202, 207, 208, 209, 370, 397, 419, 297; 340/825.24; 84/375, 404

[56] References Cited

U.S. PATENT DOCUMENTS

| | | | |
|---|---|---|---|
| 3,716,943 | 2/1973 | Orzetti | 446/397 |
| 4,562,590 | 12/1985 | DeLage . | |
| 4,662,858 | 5/1987 | Hall | 446/397 |
| 4,664,641 | 5/1987 | Hearn et al. | 446/397 |
| 4,807,051 | 2/1989 | Ogura . | |
| 4,810,997 | 3/1989 | Kudo et al. | 446/297 |
| 4,819,101 | 4/1989 | Lemelson . | |
| 4,932,920 | 6/1990 | Hearn | 446/397 |
| 4,944,704 | 7/1990 | Grace | 446/71 |
| 4,973,941 | 11/1990 | Davis et al. | 340/384 E |
| 5,049,107 | 9/1991 | De Nittis | 446/397 |
| 5,059,126 | 10/1991 | Kimball | 434/308 |
| 5,125,866 | 6/1992 | Arad et al. | 446/397 |
| 5,145,447 | 9/1992 | Goldfarb | 446/408 |
| 5,146,353 | 9/1992 | Isoguchi et al. . | |
| 5,239,587 | 8/1993 | Muckelrath . | |
| 5,349,774 | 9/1994 | Parra | 43/9.2 |
| 5,376,038 | 12/1994 | Arad et al. | 446/397 |
| 5,529,526 | 6/1996 | Wesley | 446/397 |
| 5,531,600 | 7/1996 | Baer et al. | 434/317 |
| 5,562,521 | 10/1996 | Butler et al. | 446/397 |

*Primary Examiner*—Curtis A. Kuntz
*Assistant Examiner*—Rexford Barnie
*Attorney, Agent, or Firm*—Richard C. Litman

[57] ABSTRACT

The invention relates to a portable device for use by hunters, photographers, and others for luring wildlife into close proximity. The device plays back digitally recorded wildlife sounds. The digitally recorded sounds when played back have a uniquely clear characterization such that they sound like authentic wildlife sounds. The device is generally cylindrically shaped, having a speaker mounted in the top portion thereof. To actuate the sounds, the user merely presses upon the speaker grill, forcing the speaker into the housing, upon which the speaker engages a spring biased switch thereby starting the playback of the digitally recorded wildlife sounds. Another is provided to selectively choose the animal sound desired from a myriad of predetermined animal sounds. The device operates on a battery power supply, further enhancing portability.

5 Claims, 4 Drawing Sheets

AUDIO DECOY

CROSS-REFERENCE TO RELATED APPLICATION

This application claims the benefit of U.S. Provisional Patent Application Ser. No. 60/013,567, filed Mar. 18, 1996.

BACKGROUND OF THE INVENTION

1. FIELD OF THE INVENTION

The present invention is an audio decoy for attracting wildlife for game hunting or photography. More specifically, the invention includes a digital playback of actual wildlife sounds for simulating the call of the wild, thereby luring wildlife into the focal range of the shooting instrument (i.e., firearm, bow and arrow, or camera).

2. DESCRIPTION OF THE PRIOR ART

Many recording and playback devices are known. More particularly, numerous devices for recording and/or playing back wildlife sounds in wildlife areas are available. For instance, U.S. Pat. No. 5,239,587, issued Aug. 24, 1993 to Muckelrath, discloses a recording device for hunters to place in an open area thought to be frequented by wildlife. The device is left for a period of time such that the general sounds of nature can be recorded and subsequently reviewed by the hunter. Additionally, the device includes a digital time stamp for identifying the time which the sounds were recorded so that the hunter can plan to be located in the vicinity in order to bag his game. This device does not lure game for the hunter; rather, it merely makes unattended recordings to determine if a specific area is suitable for stalking and hunting game.

Other types of devices for reproducing sounds and/or images are well known. For example, U.S. Pat. No. 4,562,590, issued Dec. 31, 1985 to DeLage, discloses a protective water resistant casing for audio equipment for use during recreational activities involving or near water. U.S. Pat. No. 4,807,051, issued Feb. 21, 1989 to Ogura, discloses a video image recording device having audio recording and distance determining functions. U.S. Pat. No. 4,819,101, issued Apr. 4, 1989 to Lemelson, discloses a video camera with an audio recording feature. U.S. Pat. No. 5,146,353, issued Sept. 8, 1992 to Isoguchi et al., discloses a still video camera having sound recording and playback features.

None of the above inventions and patents, taken either singly or in combination, is seen to describe the instant invention as claimed.

SUMMARY OF THE INVENTION

As can be understood from the prior art, a problem exists in that there is no sure way available to portably emit audio wildlife sounds in order to attract wildlife. Specifically, the prior art uses taped sounds which have been shown to be less than satisfactory in reproducing sounds. More elaborate and sophisticated equipment results in massive size and costs, reducing the ability to effectively use such systems while tracking wildlife and game.

Therefore, the present invention provides a portable device for use by hunters, photographers, and others for luring wildlife into close proximity. The device plays back digitally recorded wildlife sounds. The digitally recorded sounds when played back have a uniquely clear characterization such that they sound like authentic wildlife sounds. The device is generally cylindrically shaped, having a speaker mounted in the top portion thereof. To actuate the sounds, the user merely presses upon the speaker grill, forcing the speaker into the housing, upon which the speaker engages a spring biased switch thereby starting the playback of the digitally recorded wildlife sounds. Another switch is provided to selectively choose the animal sound desired from a myriad of predetermined animal sounds. The device operates on a battery power supply, further enhancing portability.

Accordingly, it is a principal object of the invention to provide a portable device for reproducing wildlife sounds.

It is another object of the invention to provide an inexpensive portable device for reproducing wildlife sounds.

It is a further object of the invention to reproduce authentic wildlife sounds with extreme clarity.

Still another object of the invention is to control and transport a portable wildlife sound reproduction device efficiently and economically.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
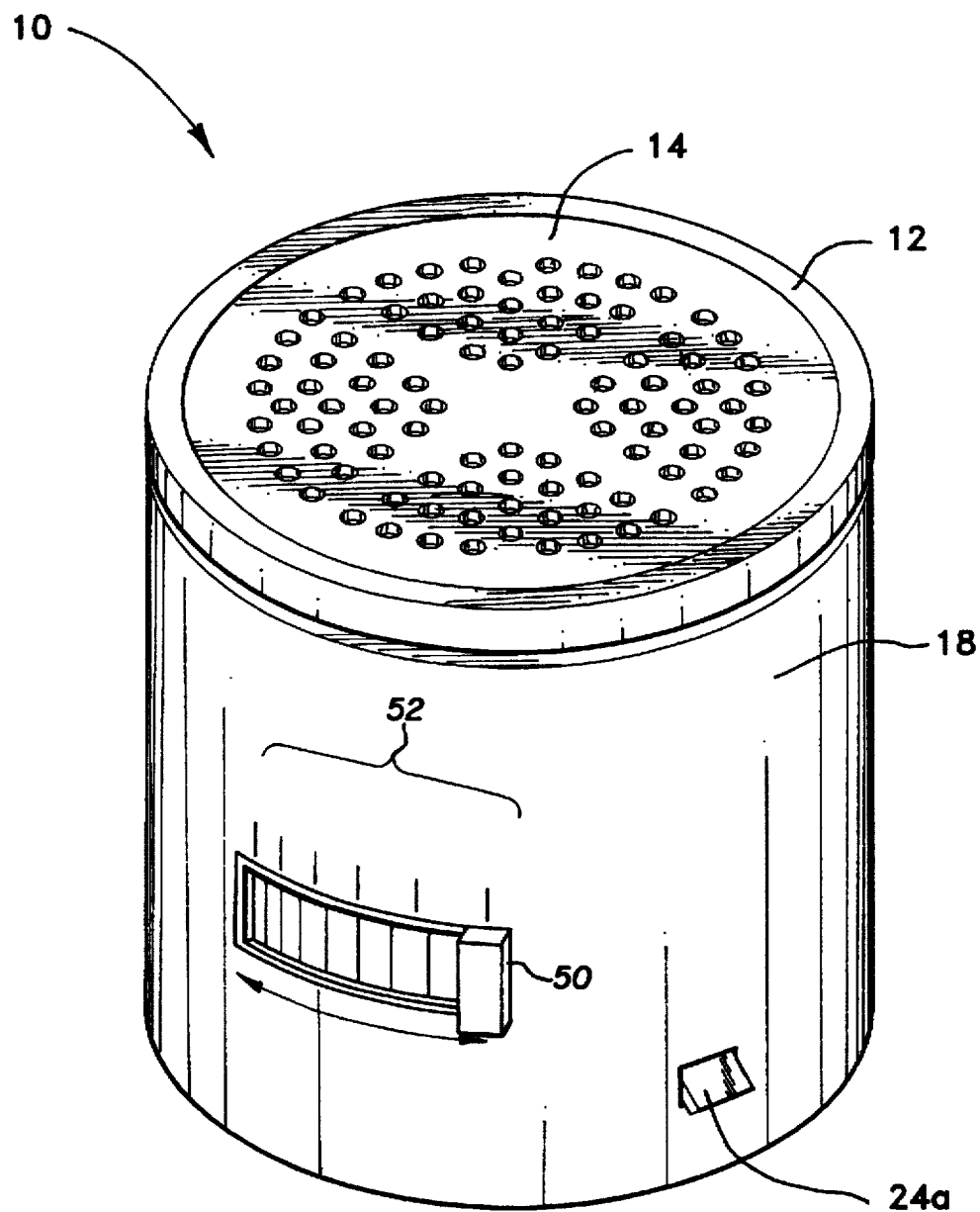
FIG. 1 is a perspective view of the invention.

The present invention, as seen in FIG. 1, is generally referred to at 10. The device 10 has a cylindrical shape, and is contained in a housing 18. The top of the housing 18 has a sealing rim 12. The rim 12 typically is a snap-on, or force fit retainer for housing 18. The rim 12 positions and holds the movable speaker (16, see FIG. 2) and protective speaker grill 14. Speaker grill 14 is a perforated hard plastic shield that protects the speaker 16 from damage. Also, latch member 24A extends through the side of housing 18, and will be discussed further below.

In addition, as shown in FIG. 1, a switch 50 is provided. Switch 50 allows the hunter or photographer to selectively choose the animal call of desire. Switch 50 has an "OFF" position and several other animal calls to choose from, generally indicated as hash marks 52. The number of hash marks indicated at 52 are illustrative, and not limiting to the myriad of calls that can be stored and chosen by the instant device.

Figure 2:
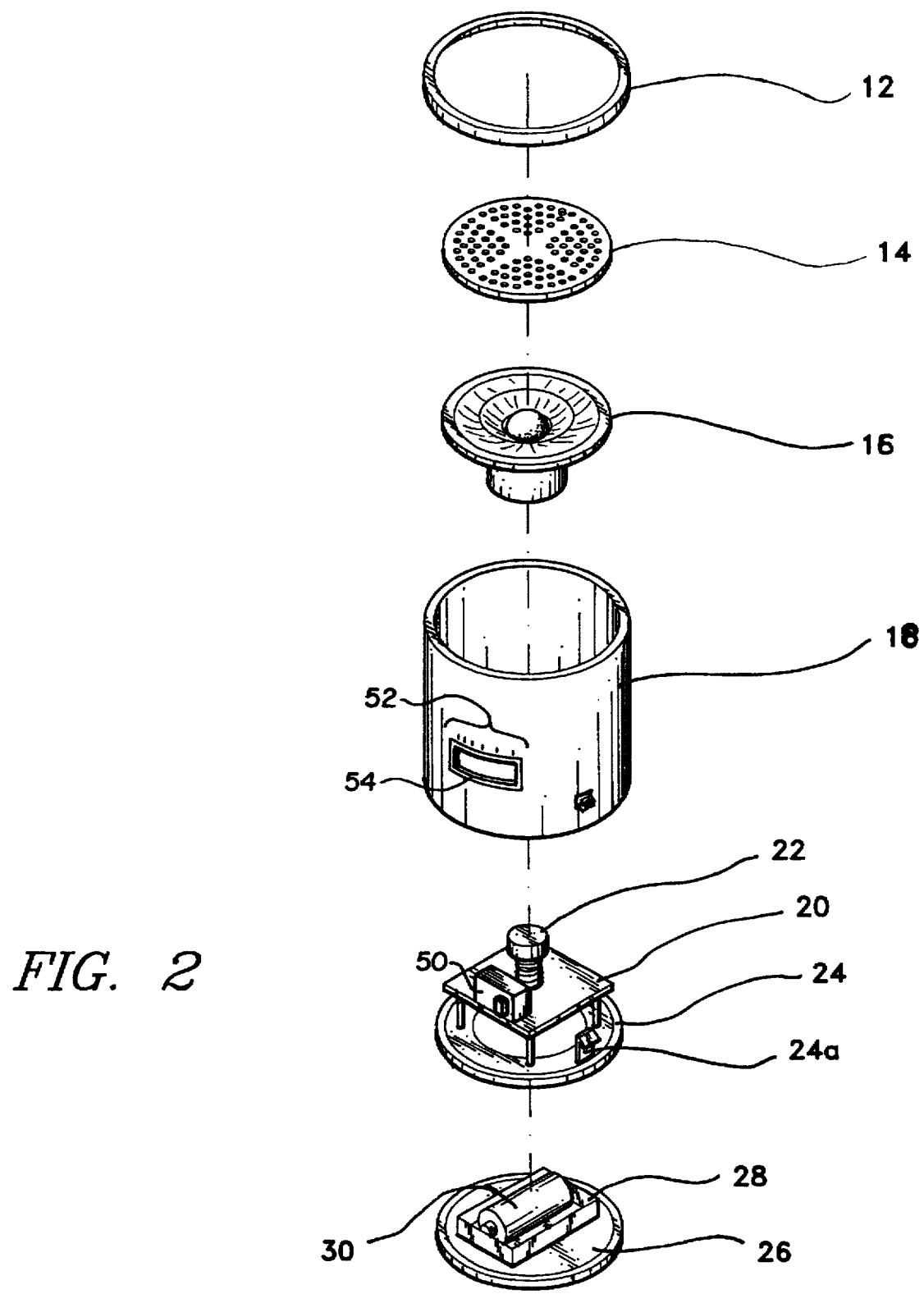
FIG. 2 is an exploded perspective view of the present invention.

Referring to FIG. 2, the device 10 is shown in an exploded view so as to illustrate the internal components of the invention. Housing 18 supports sealing rim 12 as set forth above. Rim 12 positions and retains speaker grill 14, and speaker 16. In the side wall of the housing 18 is an aperture 54 having the indicia 52 adjacent thereto. The switch 50, mounted to circuit board 20, extends through the aperture 54 allowing the hunter or photographer activate the selected animal call chosen according to the indicated animal call selection or "OFF" at 52.

Speaker 16 and speaker grill 14 are axially displaceable in housing 18. The displacement is limited by the sealing rim 12 at the top and a spring biased switch member 22 below. The user activates the device by pressing on the speaker grill 14, which moves the speaker, in unison, downwardly in housing 18 against the upward force of the spring biased switch member 22. When the speaker 16 is moved against the spring, the spring biased switch member 22 is depressed. The spring biased switch member 22 is mounted on and in electrical communication with a digital audio sound reproducing circuit board 20.

The circuit board 20 is supported within housing 20 on a circuit board carrier 24. Circuit board carrier 24 is fixedly positioned in housing 18, and is secured by latch member 24A. Typically, there are at least two opposing latch members 24A. However, it is possible to provide a greater number of latch members 24A or even substitute any known latching arrangement for fixing the circuit board 20 in housing 18.

At the bottom of housing 18 is a battery compartment 28. The compartment 28 is conveniently located and accessed via a battery access door 26. Located in the battery compartment 28 is a battery 30 for providing electrical power to the circuit board 20. The battery access door 26 mounts to the bottom of housing 18 in a standard conventional manner known to those skilled in the art. Likewise, the battery 30 is also a conventionally provided power source and the skilled artisan is well aware of the appropriate power ratings.

Figure 3:
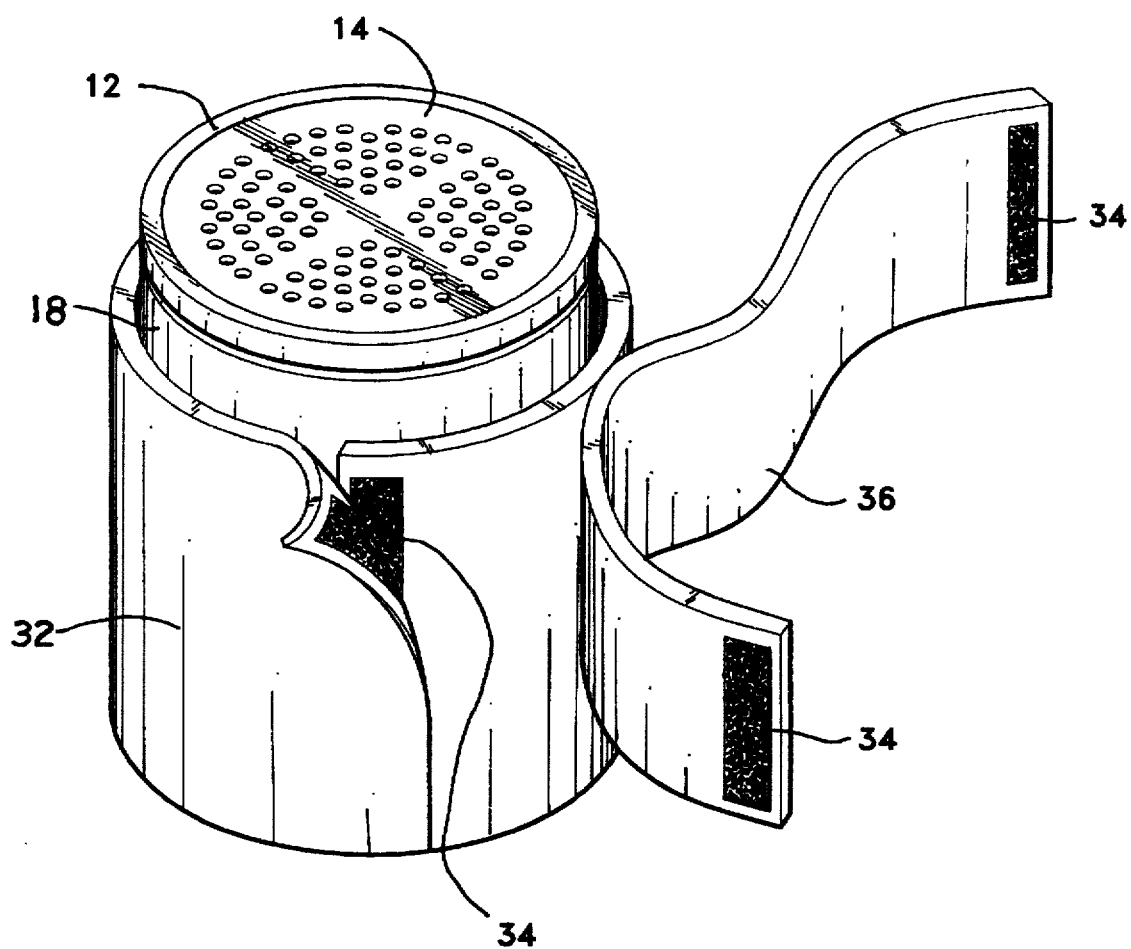
FIG. 3 is a perspective view of the invention with one type of carrier.
Figure 4:
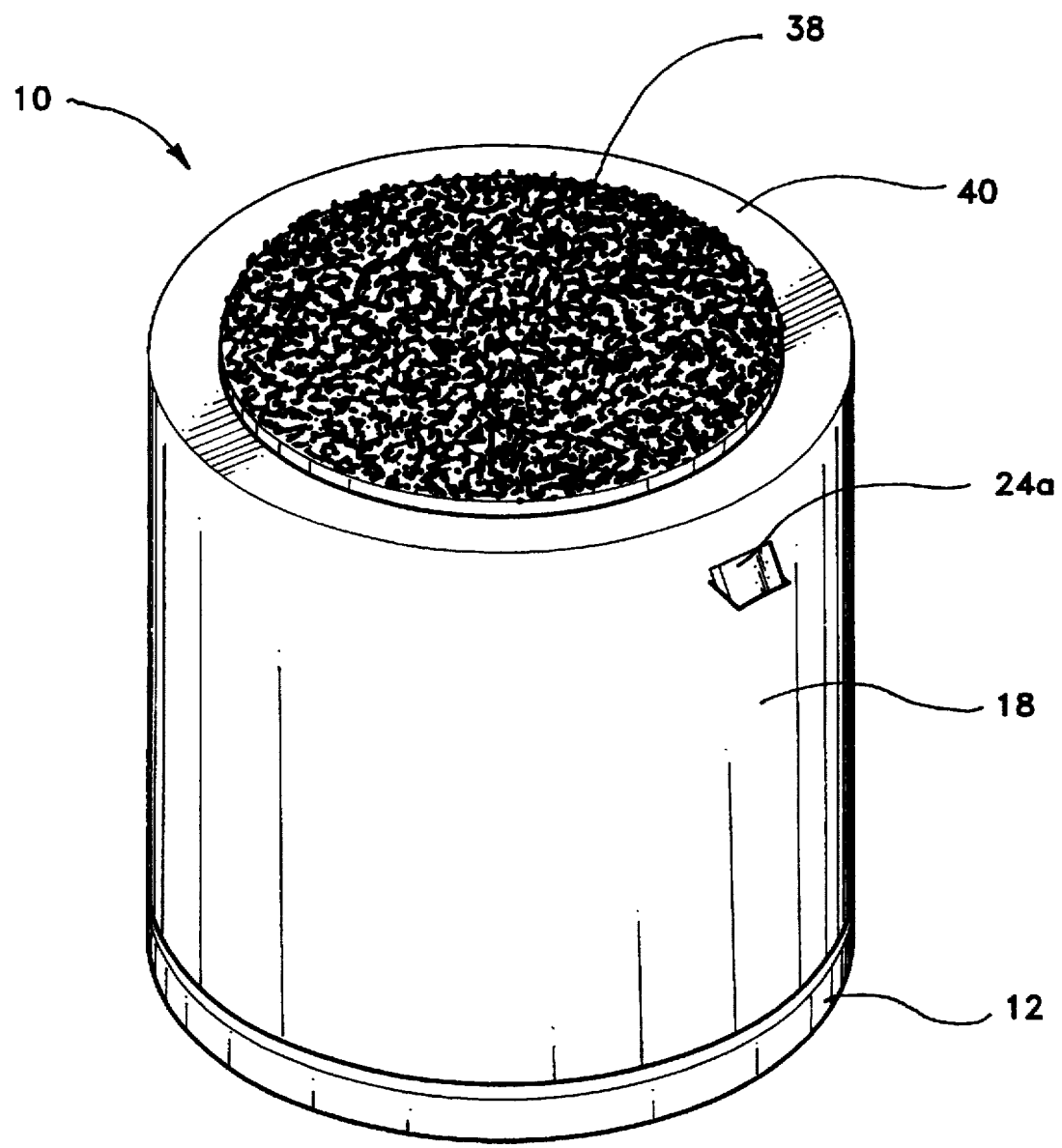
FIG. 4 is a bottom perspective view of the invention with an alternative type of carrier.

FIGS. 3 and 4 show typical arrangements for handling the device 10. A hunter or wildlife photographer will spend countless hours waiting in the shadows or brush hoping for the subject of choice to appear. The device 10 assists the hunter or photographer by reproducing the sounds (i.e., animal calls) of the chosen wildlife subjects sought. For example, if ducks were the subjects of interest, device 10 would be selected for generating duck quacking calls. The hunter or photographer depresses the grill 14, as discussed earlier, activating the circuit 20 which then delivers via the speaker 16 duck quacking calls. Another example, if turkeys were the subjects of interest, device 10 would be selected for generating turkey gobbling calls. The hunter or photographer depresses the grill 14, as discussed earlier, activating the circuit 20 which then delivers via the speaker 16 turkey gobbling calls. Eventually, because the device produces such realistic sounds because of the digital sound reproduction technology, ducks or turkeys (or whatever animals that have been called) begin to gather nearby, ready to be shot by the hunter or photographer.

To make it easier to access the device 10, a sleeve 32 wraps around the housing 18; sleeve 32 is held in position by standard hook and loop type fastener 34. Attached to the sleeve 32 is a strapping member 36 that is fitted around an appropriate support (e.g., tripod leg, rifle stock, users leg or arm, etc.) and also held by the same hook and loop type fastener 34. Alternatively, a circular disk of 38 consisting of one part of a hook and loop type fastener is adhesively attached to the bottom 40 of housing 18. A corresponding mating part (not shown) is adhesively attached to an appropriate support (likewise, as set forth above). In either arrangement the device 10 is supported in a manner that allows easy access for the user to reach the speaker grill 14 in order to activate the circuit 20 and produce the desired calls of nature. Also, the supporting arrangements aid in allowing the device to produce the sounds without obstruction because the housing 18 is supported such that the speaker 16 has an open audio range to project the wildlife sounds. Thus the device 10 provides a simply constructed, and extremely efficient portable audio decoy for attracting desired wildlife within the focal range of a hunter or photographer.

While the invention has been illustrated and described in detail in the drawings and foregoing description, the same is to be considered as illustrative and not restrictive in character and scope. For instance, the housing 18 may equally and easily be adapted to accommodate different shape such as square or triangular, etc. In addition, it is within the spirit and scope of the present invention to adhesively couple or integrally manufacture the circuit board carrier 24 within the housing 18. Likewise, the sealing rim 12 may be secured in any one of a number of ways, viz., screw-on, tongue-in-groove interfit, or adhesive attachment to the top of housing 18.

It is to be understood that the present invention is not limited to the embodiments described above, but encompasses any and all embodiments within the scope of the following claims.

I claim:

1. An audio decoy device for selectively reproducing sounds representative of animals comprising:

a cylindrical housing having a top and an accessible bottom compartment, said top having a sealing rim;

an axially displaceable speaker positioned at the top of said cylindrical housing, said speaker being retained by said sealing rim;

circuit means located in said housing for producing digital audio signals and presenting said signals to said speaker;

conductor means coupling' said circuit means to said speaker;

spring biased switch means selectively operable for actuating said circuit means causing said circuit means to produce said signals, said switch means being operatively coupled to said speaker upon depression of said speaker within said housing;

selector switch means for selecting one of a plurality of predetermined sounds representative of animals; and, power supply means positioned in said accessible bottom compartment and electrically coupled to said circuit means for providing power thereto.

2. The device according to claim 1, further comprising a protective grill covering said speaker, said protective grill being displaceable with said speaker.

3. The device according to claim 2, further comprising latch means for securing and fixing said circuit means in said housing.

4. The device according to claim 3, further comprising memory means in said circuit means for storing digitally encoded signatures, said signatures used by said circuit means for producing said sounds.

5. The decoy device according to claim 1, further comprising means for releasibly attaching and carrying said housing.

* * * * *